TUNNEL DIODE MODULATOR AND TRANSMITTER
Filed Sept. 25, 1963
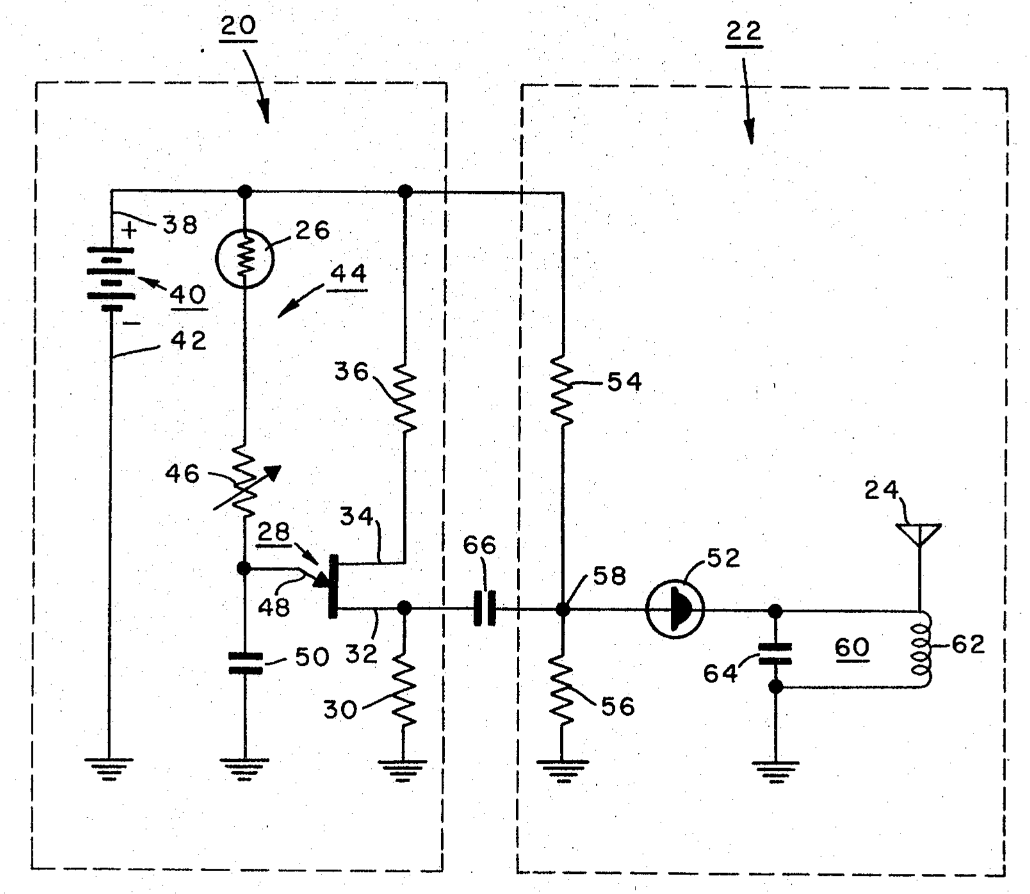
INVENTORS
JOHN R. BRAY
RONALD HORNE
ROBERT B. TAYLOR
BY Kelly O. Corley
ATTORNEY United States Patent Office 3,319,167

Patented May 9, 1967

3,319,167

TUNNEL DIODE MODULATOR AND TRANSMITTER

John R. Bray and Ronald Horne, Pensacola, and Robert D. Taylor, Milton, Fla., assignors to Monsanto Company, a corporation of Delaware Filed Sept. 25, 1963, Ser. No. 311,390

5 Claims. (Cl. 325—104)

The present invention relates a miniaturized telemetering transmitter particualrly adapted for short-range transmission of information. More particularly, the invention relates to such a telemetering transmitter which is compact and which uses entirely solid state components.

In many applications it is impractical to make direct wire connections to moving or remote objects from which information is desired. An example is transmission of data from a rotating object such as the wheel of a vehicle. Under some circumstances, slip rings may prove to be a satisfactory solution. However, slip rings are difficult to install so as to give maximum reliability and good signal transmission, as well as being troublesome in corrosive or dusty environments or at high speeds. An alternative solution is to provide a radio link between the point at which the data is derived and the central station. A current example of this practice would be telemetering of data back to earth from missiles or orbiting satellites. The prior radio links were usually adapted for transmission of data over long range, and the equipment used was thus too elaborate and expensive to have wide application. According to the present invention, an extremely simple short-range telemetering transmitter is provided by using a tunnel diode circuit from which all unnecessary components have been eliminated.

Accordingly a primary object of the invention is to provide a short-range telemetering transmitter which is suitable for transmission of data in the form of a frequency modulated signal.

A further object is to provide a transmitter of the above character which is compact and physically rugged so that it may be readily installed in adverse environments.

A further object is to provide a transmitter of the above character wherein the active elements are all solid state devices, and which requires only minimal power consumption in operation.

A further object is to provide a transmitter of the above character incorporating a simplified tunnel diode modulator design.

A further object is to provide a transmitter of the above character which is simple and efficient, particularly as compared to typical prior art designs.

A further object is to provide a transmitter of the above character which operates within the standard FM broadcast band, thus permitting recovery of the data by conventional and readily available FM receivers.

Other objects of the invention will in part be obvious and will in part appear hereinafter.

The invention accordingly comprises a circuit possessing the features, properties, and the relations of components which will be exemplified in the circuit hereinafter described, and the scope of the invention will be indicated in the claims.

For a more complete understanding of the nature and objects of the invention, reference should be had to the following detailed description taken in connection with the accompanying drawing, in which the single figure is a schematic circuit diagram of the preferred embodiment of the invention.

Referring now generally to the drawing, the data transmitter according to the present invention includes a signal generator 20 which is adapted to sense some variable and to encode this information in the proper form to be fed to a frequency modulator and transmitter 22. As will be more fully explained, modulator 22 is simplified in comparison to typical prior art practice. The output of modulator 22 is radiated by an antenna 24 as a frequency modulated signal which may be received by a frequency modulation (FM )receiver of standard design, whereby the original data or information may be recovered.

Referring now specifically to the drawing, signal generator 20 includes a thermistor 26 having a negative temperature coefficient of resistance. Thermistor 26 serves to provide a signal related to the variable being measured (in this instance, temperature). The resistance variations of thermistor 26 are used to vary the output of a relaxation oscillator formed by unijunction transistor 28 and its associated circuitry. Thus a first resistor 30 connects the first base electrode 32 of transistor 28 to a point of reference potential. The second base electrode 34 of transistor 28 is connected by resistor 36 to the positive terminal 38 of D.C. power supply 40. The negative terminal 42 of power supply 40 is connected to the point of reference potential. Thermistor 26 is connected in a series resistive circuit 44, which further includes a variable trimming resistor 46, between positive terminal 38 and the emitter electrode 48 of transistor 28. A capacitor 50 connects emitter electrode 48 to the point of reference potential. The circuit as thus far described constitutes a relaxation oscillator wherein the repetition rate of the output pulses is determined by the total resistance of circuit 44 and by the capacitance of capacitor 50. Capacitor 50 charges through resistive circuit 44 at a rate determined by the respective impedance values. When the potential across capacitor 50 rises to the firing potential of transistor 28, transistor 28 turns on and permits capacitor 50 to discharge through resistor 30. This produces an output pulse on base electrode 32, after which transistor 28 again becomes non-conductive. This action is continually repeated. The repetition rate at which the output pulses are produced is determined primarily by the impedance values of resistive circuit 44 and capacitor 50, and since thermistor 26 has an impedance which varies with temperature, the repetition rate of the output pulses at base 32 is dependent upon temperature.

As noted above, the output signal of generator 20 is coupled to the modulator 22, wherein it is used to frequency modulate the output signals of the modulator section. Modulator 22 consists of a simplified tunnel diode modulator circuit, and includes a tunnel diode 52 as its active element. A pair of resistors 54 and 56 are connected in series across power supply 40, forming a voltage divider with an intermediate tap at terminal 58 to provide appropriate anode voltage for diode 52. As may be seen from the drawing, terminal 58 is positive with respect to the point of reference potential. The anode electrode of tunnel diode 52 is directly connected to terminal 58, while the cathode electrode of diode 52 is connected through a tank circuit 60 to the point of reference potential. Tank circuit 60 as illustrated includes an inductor 62 and a paralleled variable capacitor 64. Modulator 22 as thus described is basically an oscillator operating at a frequency primarily determined by the resonant frequency of tank circuit 60, for a given anode bias potential appearing across resistor 56.

The pulse signal output of signal generator 20 is coupled to the input of the modulator 22 by a capacitor 66 which connects base electrode 32 with terminal 58. The pulse signal coupled through capacitor 66 instantaneously varies the anode bias applied to diode 52. Since the negative resistance portion of the characteristic curve of diode 52 is not perfectly linear, the negative conductance of diode 52 charges slightly as the anode bias changes. This shifts the resonant frequency of modulator 22 and produces a frequency modulated signal at the cathode of diode 52. Antenna 24 is coupled to the cathode of diode 52, to transmit this FM signal to a remotely located FM receiver. Modulator 22 is generally similar to known tunnel diode modulators, but differs therefrom primarily in that an anode radio frequency (RF) bypass capacitor shunting resistor 56 has been eliminated. It has been discovered that the modulator circuit 22 having the component values given below and the same circuit with a .001 microfarad ceramic RF bypass capacitor perform substantially identically for short-range transmission of data, except for a shift in center frequency of about a megacycle. The elimination of this component permits the data transmitter to be made more compactly and economically than was previously possible.

As a specific example, the following component values have been found to be satisfactory:

Resistor 30, 15 ohms
Resistor 36, 390 ohms
Resistors 44 and 46, 2.2 kilohms
Capacitor 50, 1.5 microfarads
Capacitor 66, 1.5 microfarads
Resistor 54, 560 ohms
Resistor 56, 22 ohms
Tank circuit 60 was tuned to 97 megacycles
Transistor 28 General Electric type 2N1671A
Tunnel diode 52 General Electric type 1N2939
Power supply 40, 3.75 volts It should be understood that the foregoing component values are by way of example and are not definitive of the scope of the invention.

It may be seen from the above disclosure and the accompanying drawing that there has been provided a miniaturized telemetering transmitter particularly adapted for short-range transmission of data or information. The transmitter as above disclosed utilizes an extremely simple tunnel diode FM modulator from which all unnecessary components have been eliminated. The entire transmitter used only solid state active elements which require very small power for their operation. In addition, the compactness and ruggedness of the circuit permit wide application of the transmitter in a variety of adverse environments. When the modulator is designed to transmit within the standard FM broadcast band, as is preferred, the data may be recovered by conventional and readily available FM receivers.

It will thus be seen that the objects set forth above, among those made apparent from the preceding description, are efficiently attained and, since certain changes may be made in the above circuit without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A telemetering transmitter consisting of, in combination:
(a) positive and negative power supply terminals,
(b) a resistive voltage divider connected to said positive and negative terminals and having an intermediate junction,
(c) a series circuit including a forwardly biased tunnel diode and a resonant tuned circuit connected in series between said intermediate junction and said negative supply terminal,
(d) an antenna coupled to said tuned circuit, (e) and means applying a pulse signal to said intermediate junction.

2. A telemetering transmitter comprising in combination:
(a) a signal generator, said signal generator comprising:
(1) positive and negative power supply terminals,
(2) a unijunction transistor having first base, second base and emitter electrodes,
(3) a first resistor connecting said first base electrode to said negative terminal,
(4) a second resistor connecting said second base electrode to said positive terminal,
(5) a first capacitor connecting said emitter to said negative terminal,
(6) and a series circuit connecting said emitter to said positive terminal, said series circuit comprising a thermistor and a third resistor,
(b) a frequency modulation transmitter, said transmitter comprising:
(1) a resistive voltage divider connected across said terminals and having an intermediate tap,
(2) a tunnel diode having anode and cathode electrodes, said anode being connected to said tap,
(3) a parallel tuned circuit connecting said cathode to said negative terminal,
(4) and an antenna coupled to said tuned circuit,
(c) and a capacitor connected between said anode and said first base electrode.

3. The transmitter defined in claim 2 wherein said third resistor is variable.

4. A telemetering transmitter comprising in combination:
(a) a signal generator, said signal generator comprising:
(1) positive and negative power supply terminals,
(2) a unijunction transistor having first base, second base and emitter electrodes,
(3) a first resistor connecting said first base electrode to said negative terminal,
(4) a second resistor connecting said second base electrode to said positive terminal,
(5) a first capacitor connecting said emitter to said negative terminal,
(6) and a series circuit connecting said emitter to said positive terminal, said series circuit comprising a thermistor and a third resistor,
(b) a frequency modulation transmitter, said transmitter comprising:
(1) a resistive voltage divider connected across said terminals and having an intermediate tap,
(2) a series circuit including a forwardly biased tunnel diode and a resonant tuned circuit connected in series between said tap and said negative supply terminal,
(3) and an antenna coupled to said tuned circuit,
(c) and a capacitor connected between said anode and said first base electrode.

5. A telemetering transmitter consisting of, in combination:
(a) positive and negative power supply terminals,
(b) a resistive voltage divider connected to said positive and negative terminals and having an intermediate junction,
(c) a series circuit including a forwardly biased tunnel diode and a resonant tuned circuit connected in series between said intermediate junction and said negative supply terminal,
(d) an antenna coupled to said tuned circuit,
(e) and means for applying a signal to said intermediate junction.

(References on following page)

References Cited by the Examiner

UNITED STATES PATENTS

| | | | |
|---|---|---|---|
| 3,158,027 | 11/1964 | Kibler. | |
| 3,173,107 | 3/1965 | Scharf et al. | 331—111 |
| 3,174,103 | 3/1965 | Monroe | 325—105 X |
| 3,212,027 | 10/1965 | Ko | 325—105 X |

OTHER REFERENCES

Caringella, Popular Electronics, February 1962, pp. 56–58 and 106.

Cleary et al., Radio-Electronics, vol. 34, No. 6, June 1963, pp. 37–39.

G.E. Transistor Manual, 5th ed., 1960, published by G.E. Co., pp. 163, 164.

References Cited by the Applicant

G.E. Transistor Manual, Fifth Edition, published by G.E. Company, 1960, pp. 163 and 164.

Unijunction Temperature Compensation, by D. V. Jones, G.E. Application Note 90–12, 4–62.

G.E. Silicon Controlled Rectifier Manual, Second Edition, the G.E. Company, 1961, p. 46.

DAVID G. REDINBAUGH, *Primary Examiner.*

JOHN W. CALDWELL, *Examiner.*